Aug. 9, 1938.   J. CORYDON, JR., ET AL   2,126,092
WATER MODIFYING APPARATUS
Filed April 4, 1932
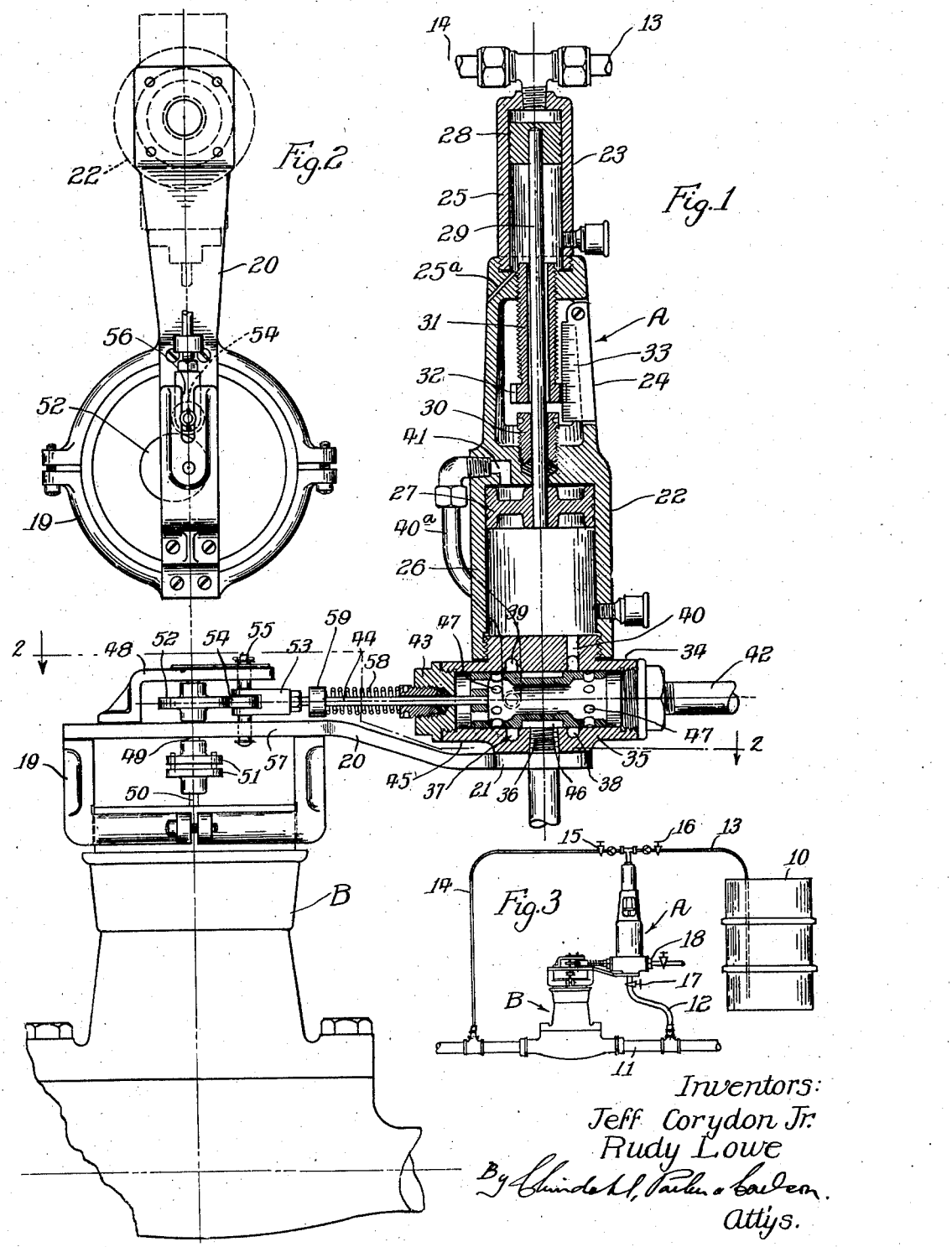
Inventors:
Jeff Corydon Jr.
Rudy Lowe
Attys.

Patented Aug. 9, 1938

2,126,092

UNITED STATES PATENT OFFICE 2,126,092

WATER-MODIFYING APPARATUS

Jeff Corydon, Jr., and Rudy Lowe, Chicago, Ill., assignors to Proportioneers, Inc., Providence, R. I., a corporation of Rhode Island Application April 4, 1932, Serial No. 603,016

3 Claims. (Cl. 210—40)

This invention relates to apparatus for treating water or other liquids, as for example, to soften or chlorinate water.

It is an object of the invention to provide a new and improved apparatus to inject a reagent into a flowing stream of water or other fluid.

A further object of the invention is to provide an apparatus of the character described embodying new and improved means by which the pressure of the fluid to be treated may be controlled so as to actuate the injecting means.

In furtherance of the above object, a relatively small percentage of the untreated fluid is utilized to actuate the injecting means, its flow being controlled by a balanced valve requiring a negligible amount of power for its operation, the valve in turn being actuated by a meter or other form of flow responsive means interposed in the supply line from which the fluid to be treated is obtained.

Other objects and advantages will become apparent from the following description taken in connection with the accompanying drawing, in which:

Figure 1 is an elevational view of a water-modifying apparatus embodying the features of our invention.

Fig. 2 is a fragmental detail view illustrating means for effecting a driving connection between certain elements of the device, the view being taken in the plane of line 2—2 of Fig. 1.

Fig. 3 is a diagrammatic view of one form of the apparatus as applied to a water system.

The apparatus comprising the present embodiment of the invention is hereafter described in connection with a water-modifying system, but it will be understood that it is adapted to a wide field of other uses involving the treatment of a flowing stream of fluid.

In the embodiment herein shown of the invention, proper quantities of water-modifying reagent are withdrawn from a reagent reservoir 10 and discharged into the flowing stream in a supply pipe 11 by means of automatic mechanism generally designated A, the operation of the mechanism A being controlled by a device B which is interposed in the pipe line 11 between the source of water supply and the point at which it is consumed, the device B being sensitive to the flow of water in the pipe. A relatively small pipe 12 connects the line 11 with the mechanism A and pipes 13, 14 provide connections between the reagent reservoir 10, the mechanism A and the pipe line 11. Suitable check valves 15 and 16 prevent the pressure of the line from being exerted upon the reagent tank and likewise prevent the mechanism A from returning the reagent to the reservoir. A throttle stop-cock 17 interposed in the line 12 is effective to regulate a flow of fluid to the mechanism A, the spent fluid being exhausted through a conduit 18 either to waste or into the pipe line 11 at any point characterized by a lower static head.

Referring to Fig. 1 the device B in this instance is a conventional type of water meter, its upper cylindrical surface being provided with an upstanding structural collar 19, the collar in turn forming a support for a laterally extending arm 20.

The outwardly extending end of the arm 20 constitutes a base for the mechanism A, machine screws 21 providing a rigid and detachable connection between the two.

The automatic mechanism A comprises a hydraulic reciprocating motor 22 and an alined tandem-connected reciprocating pump 23, the pump and the driving motor being spaced apart by an intermediate yoke 24. The pump 23 includes a cylinder 25, the upper end of which connects with the pipes 13 and 14 through the respective check valves 15 and 16, its lower end being united to the atmosphere by a duct 25a. The hydraulic motor 22 consists of a cylinder 26, the upper end of which forms the base of the yoke member 24. A piston 27 in the motor cylinder 26 is rigidly connected with a piston 28 in the pump cylinder 25 by means of a common piston rod 29. A stuffing gland 30 provides a liquid seal between the piston rod and the upper end of the cylinder 26.

Means effective to regulate the quantity of reagent discharged by the pump in each cyclic movement is provided which in this instance comprises a stroke-regulating means interposed between the pump and motor cylinders. A sleeve 31 surrounding the piston rod 29 intermediate the pump and motor cylinders is adapted to be adjusted longitudinally with respect to the bore of the pump cylinder so as to afford an abutment against which the piston 28 will strike in each stroke. The external surface of the sleeve 31 is screw threaded for rotation into and out of a threaded bore in the upper end of the yoke member which communicates with, and is formed coaxially of the longitudinal axis of the cylinder 23. The lower end of the sleeve 31 is provided with an enlarged notched shoulder 32. A lineal scale 33 freely pivoted adjacent the upper end of the yoke member normally tends to hang with its inner or left hand edge, as viewed in the drawing, in one of the notches of the shoulder 32, thus preventing accidental movement of the sleeve 31. In addition, the scale 33 enables the operator to accurately adjust the mechanism for any desired stroke of the piston 28.

The flow of fluid from the pipe line 11 through the connecting pipe 12 to the hydraulic motor 22 is controlled by a valve mechanism 34 which in turn is actuated by the water meter B. The valve 34 comprises a valve casing 35, the axis of which extends normally to the axis of the piston rod 29 and is provided intermediate its ends with a port 36 communicating with the pipe 12. Annular recesses 37 and 38 communicate through ports 39 and 40 with the upper and lower ends respectively, of the cylinder 26, the port 39 opening into a short conduit 40ᵃ which in turn connects with a bore 41 in the upper end wall of the cylinder. The right hand end of the valve casing opens into a discharge pipe 42 and its left hand end is formed to receive a removable head 43 which in turn is bored to slidably support a valve stem 44. The valve stem 44 is rigidly connected to a hollow cylindrical valve 45, the central section of which is reduced in diameter at 46 throughout a distance somewhat less than the distance between the annular recess 37 and 38 in the valve casing. A plurality of apertures 47 spaced about the circumference of the valve on either side of the reduced section 46, provide communication with the hollow interior of the valve.

The valve 45 is actuated by the water meter B in the following manner: A bracket 48 is attached to, and overlies a portion of the arm 20 so as to provide a bearing for a short shaft 49 which extends upwardly from the shaft 50 of the meter, the respective shafts being non-rotatably connected by means of a coupling 51. An eccentric 52 is rigidly connected with the shaft 49 between the arm 20 and bracket 48. The left hand end of the valve stem 44 as viewed in Fig. 1, is provided with a yoke 53, the arms of which support a roller 54 guided for movement in contact with the eccentric 52 by means of a shaft 55, the ends of which project vertically through alined slots 56 and 57, formed in the bracket 48 and the arm 20 respectively. A spring 58 interposed between a collar 59 on the stem 44 and a gland in the end 43 of the valve casing, normally acts to urge the roller 54 into engagement with the cam.

Assuming that the shaft 50 rotates in a clockwise direction as viewed in Fig. 2, it will be evident that a flow of water in the pipe 11 will rotate eccentric 52 which in turn will operate to move the valve stem 44 to the right as viewed in Fig. 1, thereby initiating movement of the hydraulic motor 22. Further rotation of the eccentric 52 permits the spring 58 to move the valve in the opposite direction to effect a return of the piston of the hydraulic motor to starting position.

In operation, fluid from the pipe line 11 will flow through the port 36 into the annular space defined between the reduced section 46 of the valve and the valve casing, and, since the fluid will be free to act in all directions, no resistance will be afforded to movement of the valve. When the valve is moved to the left, for example, as viewed in Fig. 1, fluid will pass from the section 46 into the annular recess 37 through port 39, conduit 40ᵃ and bore 41 to the upper side of the piston 27, thereby driving the latter downwardly and effecting a suction action of the pump piston 28 so as to draw a quantity of reagent into the cylinder 25. Such liquid as may have been in the lower end of the cylinder 26 will be exhausted through the port 40, annular recess 38, and bores 47 into the interior of the valve from whence it will be discharged to the waste pipe 42. When the valve is moved to the right, as viewed in Fig. 1, fluid under pressure from the pipe line 11 is admitted to the lower end of the cylinder 26 to drive the piston 27 upwardly, and fluid in the upper end of the cylinder 26 is exhausted through the bore 41, conduit 40, port 39, recess 37 and bores 47 to the interior of the valve as explained in the previous phase of the cycle of movement of the valve. It will be evident that the valve 45 is balanced in all phases of operation so that only a minimum operating force is necessary to effect its movement in the valve casing. During the upward stroke of piston 27 the reagent in the pump cylinder 25 will be driven outwardly past check valve 15, through pipe 14 and into the stream of fluid in pipe 11.

It will be seen that the construction of the valve 34 is such that only a minimum load will be placed upon the meter as an incident to effecting its operation. Furthermore the alined tandem-connected pump and hydraulic motor afford a simple and efficient means of injecting the reagent into the flowing stream of fluid under the influence of the power derived from the fluid itself.

We claim as our invention:

1. A combined motor and pump for a system of the class described comprising a motor cylinder, a motor piston rod projecting externally of one end of said cylinder, a valve member normally disposed to the longitudinal axis of said motor cylinder and communicating with both ends thereof, said valve including a ported sleeve effective to simultaneously admit pressure fluid to one end of said motor cylinder and to exhaust pressure fluid from the opposite ends of said motor cylinder, a pump cylinder coaxial with and spaced from said motor cylinder, said motor piston rod projecting interiorly of said pump cylinder, and a manually adjustable stroke regulating screw intermediate said motor and pump cylinders.

2. A device of the character described comprising a motor cylinder and a pump cylinder mounted in alignment with a substantial open space between the adjacent ends thereof, pistons in said cylinders, a connecting rod extending through the adjacent ends of said cylinders and through said space therebetween and fixed at its opposite ends to said pistons, means accessible for manual actuation in said intermediate space and operable positively to adjust the stroke of said pump, and valve means governing the admission of motive fluid to said motor cylinder.

3. A device of the character described comprising a motor cylinder and a pump cylinder mounted in alignment with a substantial open space between the adjacent ends thereof, pistons in said cylinders, a connecting rod extending through the adjacent ends of said cylinders and through said space therebetween and fixed at its opposite ends to said pistons, means accessible for manual actuation in said intermediate space and operable positively to adjust the stroke of said pump, a gauge mounted in said intermediate space and cooperating with said stroke adjusting means to indicate the length of the stroke, and valve means controlling the flow of pressure fluid to said motor cylinder.

JEFF CORYDON, Jr.
RUDY LOWE.